US012342286B2

(12) United States Patent
Yang et al.

(10) Patent No.: US 12,342,286 B2
(45) Date of Patent: Jun. 24, 2025

(54) POWER CONTROL FOR UPLINK TRANSMISSION MULTIPLEXING

(71) Applicant: QUALCOMM Incorporated, San Diego, CA (US)

(72) Inventors: Wei Yang, San Diego, CA (US); Wanshi Chen, San Diego, CA (US); Yi Huang, San Diego, CA (US); Seyedkianoush Hosseini, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 436 days.

(21) Appl. No.: 17/575,405

(22) Filed: Jan. 13, 2022

(65) Prior Publication Data

US 2022/0225239 A1 Jul. 14, 2022

Related U.S. Application Data

(60) Provisional application No. 63/137,666, filed on Jan. 14, 2021.

(51) Int. Cl.
*H04W 52/14* (2009.01)
*H04L 1/1812* (2023.01)
(Continued)

(52) U.S. Cl.
CPC ......... *H04W 52/146* (2013.01); *H04L 1/1812* (2013.01); *H04L 5/0053* (2013.01); *H04W 52/28* (2013.01)

(58) Field of Classification Search
CPC . H04W 52/146; H04W 52/28; H04W 52/281; H04W 52/34; H04W 52/346;
(Continued)

(56) References Cited

U.S. PATENT DOCUMENTS

2016/0174170 A1* 6/2016 Yang ............... H04W 52/146
370/329
2016/0353387 A1* 12/2016 Gao ................ H04W 52/346
(Continued)

FOREIGN PATENT DOCUMENTS

EP          3562221 A1    10/2019
WO    WO-2020252469 A1  12/2020

OTHER PUBLICATIONS

International Search Report and Written Opinion—PCT/US2022/012515—ISA/EPO—Apr. 25, 2022.

*Primary Examiner* — Jung H Park
(74) *Attorney, Agent, or Firm* — Holland & Hart LLP

(57) ABSTRACT

Methods, systems, and devices for wireless communications are described. The method includes assigning a first priority level to a multiplexed transmission on a first component carrier based on a priority of content (e.g., highest priority content) of a first uplink transmission and a second uplink transmission included in the multiplexed transmission, assigning a second priority level to a third uplink transmission on a second component carrier based on a content of the third uplink transmission, where the third uplink transmission overlaps in time with the multiplexed transmission, and performing the multiplexed transmission on the first component carrier at a first transmit power and the third uplink transmission on the second component carrier at a second transmit power, where the first transmit power and the second transmit power are respectively based on the first priority level and the second priority level.

30 Claims, 9 Drawing Sheets

(51) Int. Cl.
*H04L 5/00* (2006.01)
*H04W 52/28* (2009.01)

(58) Field of Classification Search
CPC .... H04W 52/36; H04L 1/1812; H04L 5/0053; H04L 5/0048; H04L 1/0026; H04L 1/0031; H04L 5/001; H04L 5/0055; H04L 5/0064; H04L 1/1692
See application file for complete search history.

(56) References Cited

U.S. PATENT DOCUMENTS

| | | | |
|---|---|---|---|
| 2019/0132847 A1* | 5/2019 | Abedini | H04W 52/38 |
| 2019/0246358 A1* | 8/2019 | Wang | H04W 52/146 |
| 2022/0210743 A1* | 6/2022 | Yi | H04W 52/146 |

* cited by examiner

POWER CONTROL FOR UPLINK TRANSMISSION MULTIPLEXING

CROSS REFERENCE

The present Application for Patent claims the benefit of U.S. Provisional Patent Application No. 63/137,666 by YANG et al., entitled "POWER CONTROL FOR UPLINK TRANSMISSION MULTIPLEXING," filed Jan. 14, 2021, assigned to the assignee hereof, and expressly incorporated by reference herein.

FIELD OF TECHNOLOGY

The following relates to wireless communications, including power control enhancement for uplink transmission multiplexing.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless systems support multiplexing of uplink transmissions. In some cases, it may be desirable to improve the effectiveness of multiplexed uplink transmissions.

SUMMARY

The described techniques relate to improved methods, systems, devices, and apparatuses that support power control prioritization of wireless communications. Generally, the described techniques provide for a user equipment (UE) determining power control prioritization of wireless communications. In some cases, the UE may perform a multiplexed transmission on a first uplink carrier. The multiplexed transmission may include a first uplink transmission that is multiplexed with a second uplink transmission. The first uplink transmission and the second uplink transmission may have different priorities. The UE may assign a first priority level to the multiplexed transmission based on the priority content (e.g., highest priority content) of the first uplink transmission and the second uplink transmission. Thus, the priority content, whether it is content of the first uplink transmission or the second uplink transmission, determines the overall priority of the multiplexed transmission.

In some cases, the UE may assign a second priority level to a third uplink transmission on a second component carrier based on a content of the third uplink transmission. In some cases, at least a portion of the third uplink transmission may overlap in time with the multiplexed transmission. In some cases, the UE may perform the multiplexed transmission on the first component carrier at a first transmit power and the third uplink transmission on the second component carrier at a second transmit power. In some cases, the UE may determine the first transmit power based on the first priority level and may determine the second transmit power based on the second priority level. If a combined total transmit power of the first and second uplink carriers would otherwise exceed a defined power ceiling, the transmit powers computed for the first and second uplink carriers may be respectively scaled back based on the respective priority levels of the uplink multiplexed transmission and the third uplink transmission. For example, if the first priority level exceeds the second priority level, the second transmit power may be scaled back by a greater amount than the first transmit power, and vice versa.

A method for power control prioritization of wireless communication by a user equipment (UE) is described. The method may include assigning a first priority level to a multiplexed transmission on a first component carrier, the multiplexed transmission including a first uplink transmission multiplexed with a second uplink transmission, where the first priority level assigned to the multiplexed transmission is based on a priority of content of the first uplink transmission and the second uplink transmission, assigning a second priority level to a third uplink transmission on a second component carrier based on a content of the third uplink transmission, where the third uplink transmission overlaps in time with the multiplexed transmission, and performing the multiplexed transmission on the first component carrier at a first transmit power and the third uplink transmission on the second component carrier at a second transmit power, where the first transmit power and the second transmit power are respectively based on the first priority level and the second priority level.

An apparatus for power control prioritization of wireless communication by a UE is described. The apparatus may include a processor, memory coupled with the processor, and instructions stored in the memory. The instructions may be executable by the processor to cause the apparatus to assign a first priority level to a multiplexed transmission on a first component carrier, the multiplexed transmission including a first uplink transmission multiplexed with a second uplink transmission, where the first priority level assigned to the multiplexed transmission is based on a priority of content of the first uplink transmission and the second uplink transmission, assign a second priority level to a third uplink transmission on a second component carrier based on a content of the third uplink transmission, where the third uplink transmission overlaps in time with the multiplexed transmission, and perform the multiplexed transmission on the first component carrier at a first transmit power and the third uplink transmission on the second component carrier at a second transmit power, where the first transmit power and the second transmit power are respectively based on the first priority level and the second priority level.

Another apparatus for power control prioritization of wireless communication by a UE is described. The apparatus may include means for assigning a first priority level to a multiplexed transmission on a first component carrier, the multiplexed transmission including a first uplink transmission multiplexed with a second uplink transmission, where the first priority level assigned to the multiplexed transmission is based on a priority of content of the first uplink transmission and the second uplink transmission, means for assigning a second priority level to a third uplink transmission on a second component carrier based on a content of the third uplink transmission, where the third uplink transmission overlaps in time with the multiplexed transmission, and means for performing the multiplexed transmission on the first component carrier at a first transmit power and the third uplink transmission on the second component carrier at a second transmit power, where the first transmit power and the second transmit power are respectively based on the first priority level and the second priority level.

A non-transitory computer-readable medium storing code for power control prioritization of wireless communication by a UE is described. The code may include instructions executable by a processor to assign a first priority level to a multiplexed transmission on a first component carrier, the multiplexed transmission including a first uplink transmission multiplexed with a second uplink transmission, where the first priority level assigned to the multiplexed transmission is based on a priority of content of the first uplink transmission and the second uplink transmission, assign a second priority level to a third uplink transmission on a second component carrier based on a content of the third uplink transmission, where the third uplink transmission overlaps in time with the multiplexed transmission, and perform the multiplexed transmission on the first component carrier at a first transmit power and the third uplink transmission on the second component carrier at a second transmit power, where the first transmit power and the second transmit power are respectively based on the first priority level and the second priority level.

In some examples of the method, apparatuses, and non-transitory computer-readable medium described herein, assigning the first priority level to the multiplexed transmission may include operations, features, means, or instructions for assigning the first priority level to a first set of symbols of the multiplexed transmission, the first set of symbols associated with the first uplink transmission and the second uplink transmission and assigning a third priority level to a second set of symbols of the multiplexed transmission, the second set of symbols associated with one of the first uplink transmission or the second uplink transmission.

In some examples of the method, apparatuses, and non-transitory computer-readable medium described herein, performing the multiplexed transmission on the first component carrier may include operations, features, means, or instructions for performing the multiplexed transmission on the first component carrier at the first transmit power for the first set of symbols and at a third transmit power different from the first transmit power for the second set of symbols.

In some examples of the method, apparatuses, and non-transitory computer-readable medium described herein, the first priority level or the second priority level, or both, may be determined according to a priority hierarchy. In some cases, the first priority level assigned to the multiplexed transmission is based on a highest priority of content of the first uplink transmission and the second uplink transmission.

Some examples of the method, apparatuses, and non-transitory computer-readable medium described herein may further include operations, features, means, or instructions for according to the priority hierarchy, content associated with a random access channel on a primary cell may have a first priority (e.g., highest priority) and content associated with a sounding reference signal transmission may have a second priority (e.g., lowest priority), where the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

Some examples of the method, apparatuses, and non-transitory computer-readable medium described herein may further include operations, features, means, or instructions for according to the priority hierarchy, content associated with a physical uplink channel that includes one or more of a high priority hybrid automatic repeat request acknowledgment feedback, or a high priority scheduling request, or a high priority link recovery request, may have a higher priority than content associated with a physical uplink channel that includes a high priority channel status information.

Some examples of the method, apparatuses, and non-transitory computer-readable medium described herein may further include operations, features, means, or instructions for according to the priority hierarchy, content associated with a physical uplink channel that includes a high priority channel status information may have a higher priority than content associated with a high priority physical uplink shared channel that lacks a high priority hybrid automatic repeat request acknowledgment feedback or a high priority channel status information.

Some examples of the method, apparatuses, and non-transitory computer-readable medium described herein may further include operations, features, means, or instructions for according to the priority hierarchy, content associated with a high priority physical uplink shared channel that lacks a high priority uplink control information may have a higher priority than content associated with a low priority physical uplink channel that includes one or more of a low priority hybrid automatic repeat request acknowledgment feedback, or a low priority scheduling request, or a low priority link recovery request, or any combination thereof.

Some examples of the method, apparatuses, and non-transitory computer-readable medium described herein may further include operations, features, means, or instructions for according to the priority hierarchy, content associated with a low priority physical uplink channel that includes one or more of a low priority hybrid automatic repeat request acknowledgment feedback, or a low priority scheduling request, or a low priority link recovery request, may have a higher priority than content associated with a low priority physical uplink channel that includes a low priority channel state information.

Some examples of the method, apparatuses, and non-transitory computer-readable medium described herein may further include operations, features, means, or instructions for according to the priority hierarchy, content associated with a low priority physical uplink channel that includes a low priority channel state information may have a higher priority than content associated with a low priority physical uplink shared channel that lacks uplink control information.

DETAILED DESCRIPTION

Figure 1:
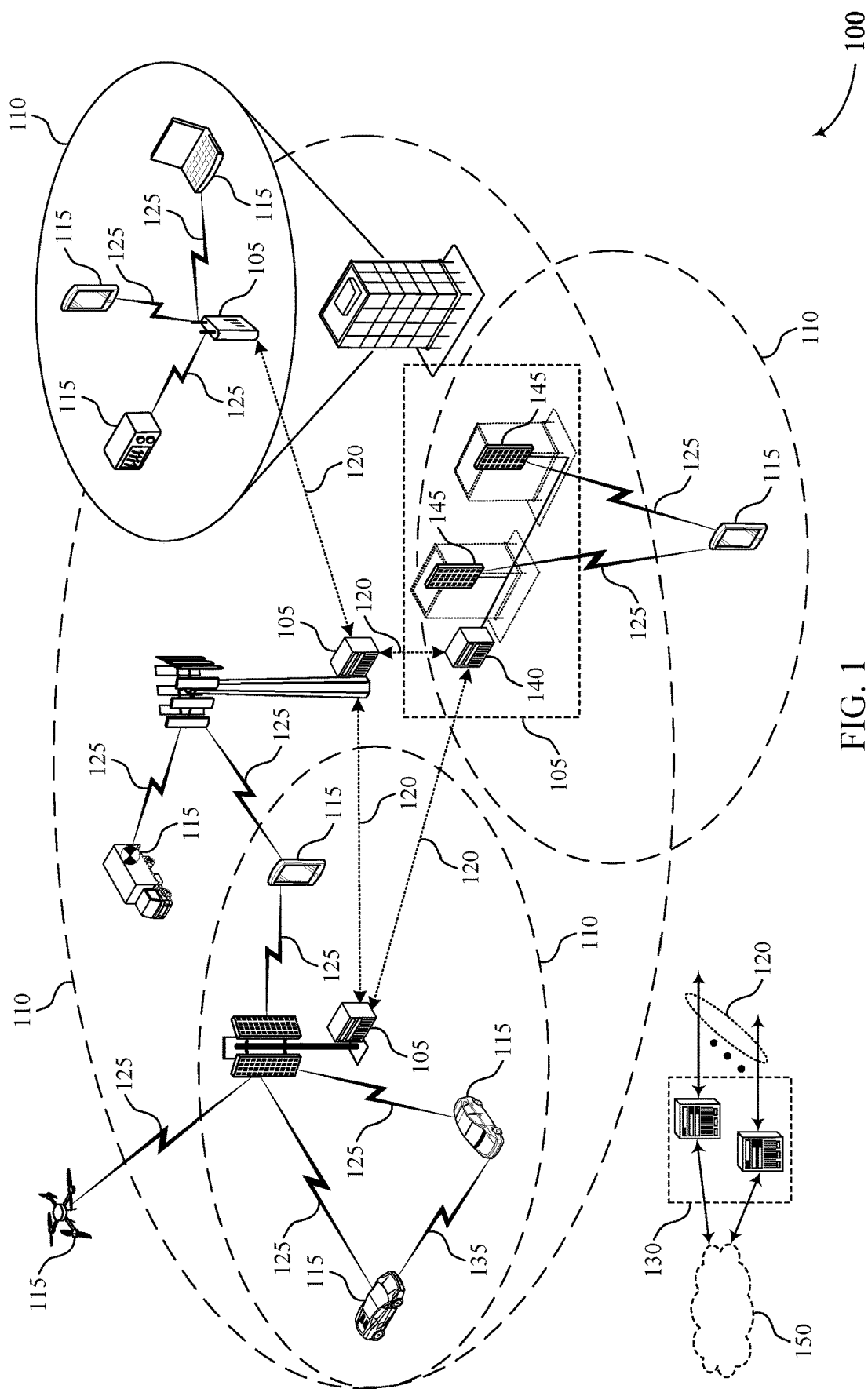
FIG. 1 illustrates an example of a wireless communications system that supports power control enhancement in accordance with examples described herein.

The present techniques include power control prioritization of wireless communications. Some systems may include two priority levels (e.g., low priority (LP or priority 0) and high priority (HP) or priority 1) for uplink transmissions to transmit traffic with different reliability/latency requirements. In some cases, HP may refer to uplink transmissions with priority index 0, and LP may refer to uplink transmissions with priority index 1. In some cases, uplink transmissions may include HP uplink transmissions (e.g., uplink transmissions that include HP content or a HP payload) and LP uplink transmissions (e.g., uplink transmissions that include LP content or a LP payload). Examples of HP content may include ultra-reliable low-latency communication (URLLC) traffic. Examples of LP content may include enhanced mobile broadband (eMBB) traffic.

In some examples, an LP transmission may be dropped when the LP transmission collides with a HP transmission (e.g., time resources of the LP transmission at least partially overlap the time resources of the HP transmission). But dropping transmissions may result in retransmissions and a poor user experience. Accordingly, some systems may multiplex uplink transmissions with different priorities into one multiplexed transmission (e.g., a HP uplink transmission and a LP uplink transmission multiplexed into a single multiplexed transmission). In some cases, two uplink transmissions may be multiplexed using puncturing or rate matching. In some cases, coding rates may be modified to allow for transmission of both uplink transmissions.

In some examples, a UE may multiplex both HP content and LP content into a multiplexed transmission. In some examples, a UE may multiplex both HP uplink control information (UCI) and LP UCI into a physical uplink control channel, or multiplex HP UCI on a LP physical uplink shared channel, or multiplex a LP UCI on a HP physical uplink shared channel. However, some systems lack techniques for determining priorities between multiplexed transmissions with mixed priorities and other uplink transmissions.

The present techniques enable a device to determine priorities between multiplexed transmissions and other uplink transmissions. In particular, the present techniques provide power control enhancements for HP and LP uplink transmission multiplexing.

In some examples, a UE may be configured to transmit more than one physical uplink channel on corresponding uplink carriers. In some cases, the UE may be configured to transmit one physical uplink control channel and one physical uplink shared channel, or transmit two physical uplink control channels in corresponding physical uplink control channel groups.

In some examples, when two or more uplink transmissions are scheduled at the same time (e.g., symbols of the two or more uplink transmissions at least partially overlap in time), a UE may perform power prioritization to determine how much power to assign to a first uplink transmission of two or more uplink transmissions and how much power to assign to a second uplink transmission of the two or more uplink transmissions. Based on the present techniques for power control prioritization, the priority of an uplink transmission may be determined by the priority of content included in the uplink transmission. The power control prioritization may be based on a power control prioritization hierarchy that indicates priorities from highest to lowest priority based on content characteristics (e.g., content type, etc.).

Aspects of the subject matter described herein may be implemented to realize one or more advantages. The described techniques may support improvements transmit power control of multiplexed transmissions based on the determined priorities of uplink transmissions. Additionally, described techniques may result in avoiding dropped transmissions, multiple retransmissions, and failed transmissions, decreasing system latency, improving the reliability of decoding high priority uplink transmissions at a base station, and improving user experience.

Aspects of the disclosure are initially described in the context of wireless communications systems. Aspects of the disclosure are further illustrated by and described with reference to environments of wireless communications systems that relate to power control for uplink transmission multiplexing. Aspects of the disclosure are further illustrated by and described with reference to apparatus diagrams, system diagrams, and flowcharts that relate to power control for uplink transmission multiplexing.

FIG. 1 illustrates an example of a wireless communications system 100 that supports power control for uplink transmission multiplexing in accordance with examples described herein. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. A base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and at least one UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). At least one physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, a served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by a resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames having a specified duration (e.g., 10 milliseconds (ms)). A radio frame may be identified by a system frame number (SFN) (e.g., ranging from 0 to 1023).

A frame may include multiple consecutively numbered subframes or slots, and a subframe or slot may have the same duration. In some examples, a frame may be divided (e.g., in the time domain) into subframes, and a subframe may be further divided into a number of slots. Alternatively, a frame may include a variable number of slots, and the number of slots may depend on subcarrier spacing. A slot may include a number of symbol periods (e.g., depending on the length of the cyclic prefix prepended to a symbol period). In some wireless communications systems 100, a slot may further be divided into multiple mini-slots containing one or more symbols. Excluding the cyclic prefix, a symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and a search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support URLLC or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which at least one UE 115 transmits to one or more other (e.g., every other) UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). An access network entity 140 (e.g., each access network entity 140) may communicate with the UEs 115 through one or more other access network transmission entities 145, which may be referred to as radio heads, smart radio heads, or transmission/reception points (TRPs). An access network transmission entity 145 may include one or more antenna panels. In some configurations, various functions of an access network entity 140 (e.g., each access network entity 140) or base station 105 may be distributed across various network devices (e.g., radio heads and ANCs) or consolidated into a single network device (e.g., a base station 105).

The wireless communications system 100 may operate using one or more frequency bands (e.g., in the range of 300 megahertz (MHz) to 300 gigahertz (GHz)). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE (e.g., a UE 115 of FIG. 1) may perform power control prioritization of wireless communications. In some cases, the UE performing power control prioritization may include the UE assigning a first priority level to a multiplexed transmission on a first component carrier. In some cases, the multiplexed transmission may include a first uplink transmission multiplexed with a second uplink transmission. In some cases, the first priority level assigned to the multiplexed transmission is based on a priority of content (e.g., highest priority content) of the first uplink transmission and the second uplink transmission. In some cases, the UE may assign a second priority level to a third uplink transmission on a second component carrier based on a content of the third uplink transmission. In some cases, the third uplink transmission at least partially overlaps in time with the multiplexed transmission. In some cases, the UE may perform the multiplexed transmission on the first component carrier at a first transmit power and the third uplink transmission on the second component carrier at a second transmit power. In some cases, the first transmit power and the second transmit power are based on the first priority level and the second priority level, respectively. In some cases, the UE may transmit the multiplexed transmission or the third uplink transmission, or both, to a base station (e.g., to a base station 105 of FIG. 1).

Figure 2:
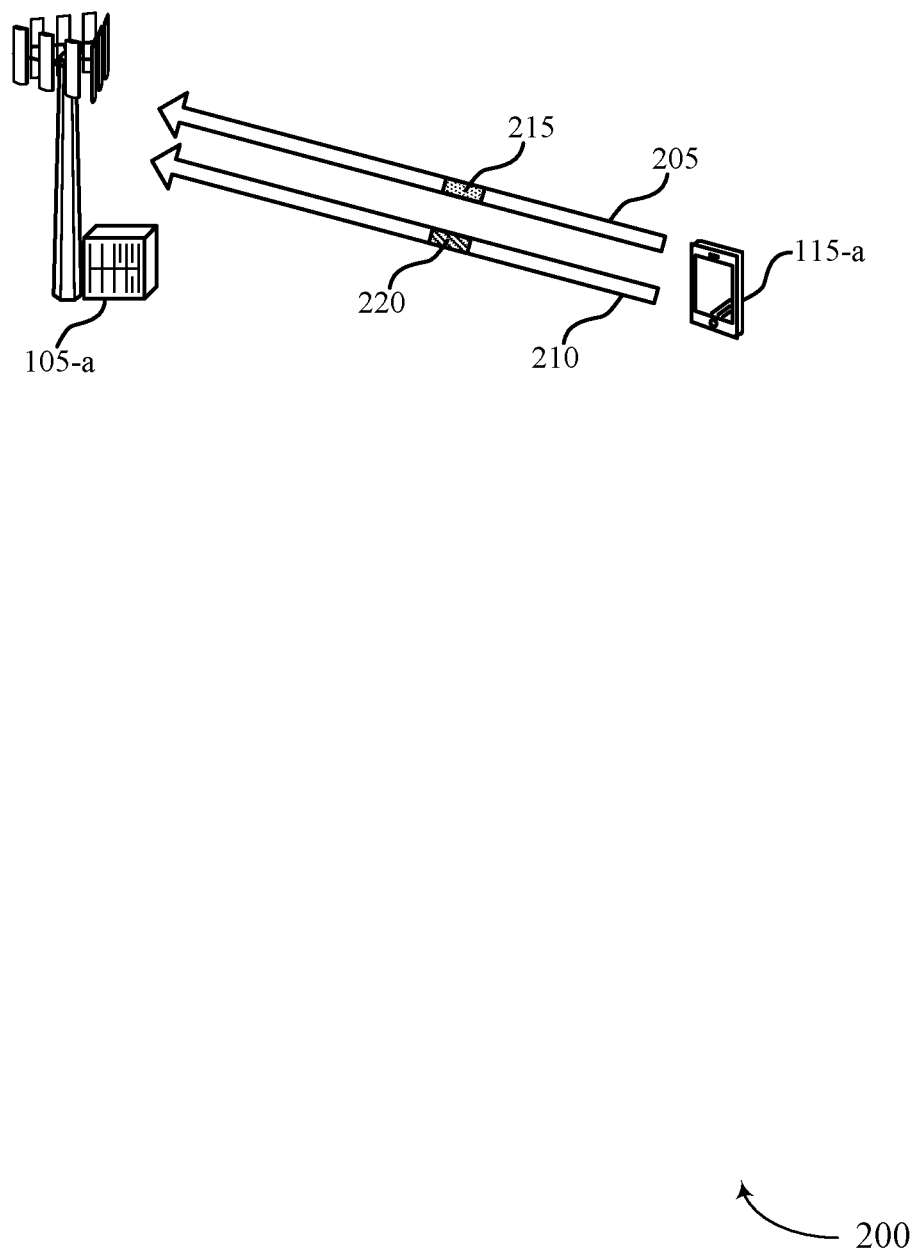
FIG. 2 illustrates an example of a wireless communication system that supports power control enhancement in accordance with examples described herein.

FIG. 2 illustrates an example of a wireless communication subsystem 200 that supports power control for uplink transmission multiplexing in accordance with examples described herein.

As illustrated, wireless communications subsystem 200 may include UE 115-a and base station 105-a, which may be examples of a UE 115 or a base station 105, as described herein with reference to FIG. 1. Wireless communications subsystem 200 may also include uplink 205 and uplink 210. In some cases, wireless communications subsystem 200 may also include a downlink. Base station 105-a may use the downlink to convey control and/or data information to UE 115-a. And UE 115-a may use uplink 205 or uplink 210, or both, to convey control and/or data information to base station 105-a. In some cases, the downlink may use different time and/or frequency resources than uplink 205 or uplink 210, or both.

In some examples, UE 115-a may perform power control prioritization of wireless communications between UE 115-a and base station 105-a. In some cases, UE 115-a may determine the priority of content carried on each uplink transmission, and then determine the transmission power for each uplink transmission based on the respective determined priorities.

In some examples, the UE 115-a performing power control prioritization may include UE 115-a assigning a first priority level to a multiplexed transmission 215 on a first component carrier of uplink 205. In some cases, the multiplexed transmission 215 may include a first uplink transmission multiplexed with a second uplink transmission. In some cases, the first priority level assigned to the multiplexed transmission 215 may be based on the content of the first uplink transmission and the second uplink transmission that has the highest priority content. In some cases, a content of first uplink transmission may have the highest priority content. Accordingly, the content of first uplink transmission determines the priority level assigned to the multiplexed transmission 215. In some cases, a content of second uplink transmission may have the highest priority content. Accordingly, the content of second uplink transmission determines the priority level assigned to the multiplexed transmission 215.

In some cases, UE 115-a may determine that a third uplink transmission 220 at least partially overlaps in time with the multiplexed transmission 215. In some cases, based on the determined overlap, UE 115-a may determine and assign the first priority level for multiplexed transmission 215 and determine and assign a second priority level for the third uplink transmission 220. In some cases, the UE 115-a may assign the second priority level to the third uplink transmission 220 on a second component carrier of uplink 210 based on the content of third uplink transmission 220 (e.g., based on the content of third uplink transmission 220 relative to the content of multiplexed transmission 215).

In some cases, the UE 115-a may perform the multiplexed transmission 215 on the first component carrier at a first transmit power and the third uplink transmission 220 on the second component carrier at a second transmit power. In some cases, the first transmit power may be based on the first priority level, and the second transmit power may be based on the second priority level. In some examples, the first priority level and the second priority level may be based on a power control prioritization hierarchy. As shown, UE 115-a may transmit the multiplexed transmission 215 to base station 105-a, or the third uplink transmission 220 to base station 105-a, or transmit both to base station 105-a.

The present techniques improve power usage and efficiency of one or more devices (e.g., battery-operated devices, a UE 115 of FIG. 1 or FIG. 2, etc.) by prioritizing power control of wireless communications that include multiplexed transmissions, thus improving user experience of the one or more devices with longer battery life, improved quality of service, and improved data throughput.

Figure 3:
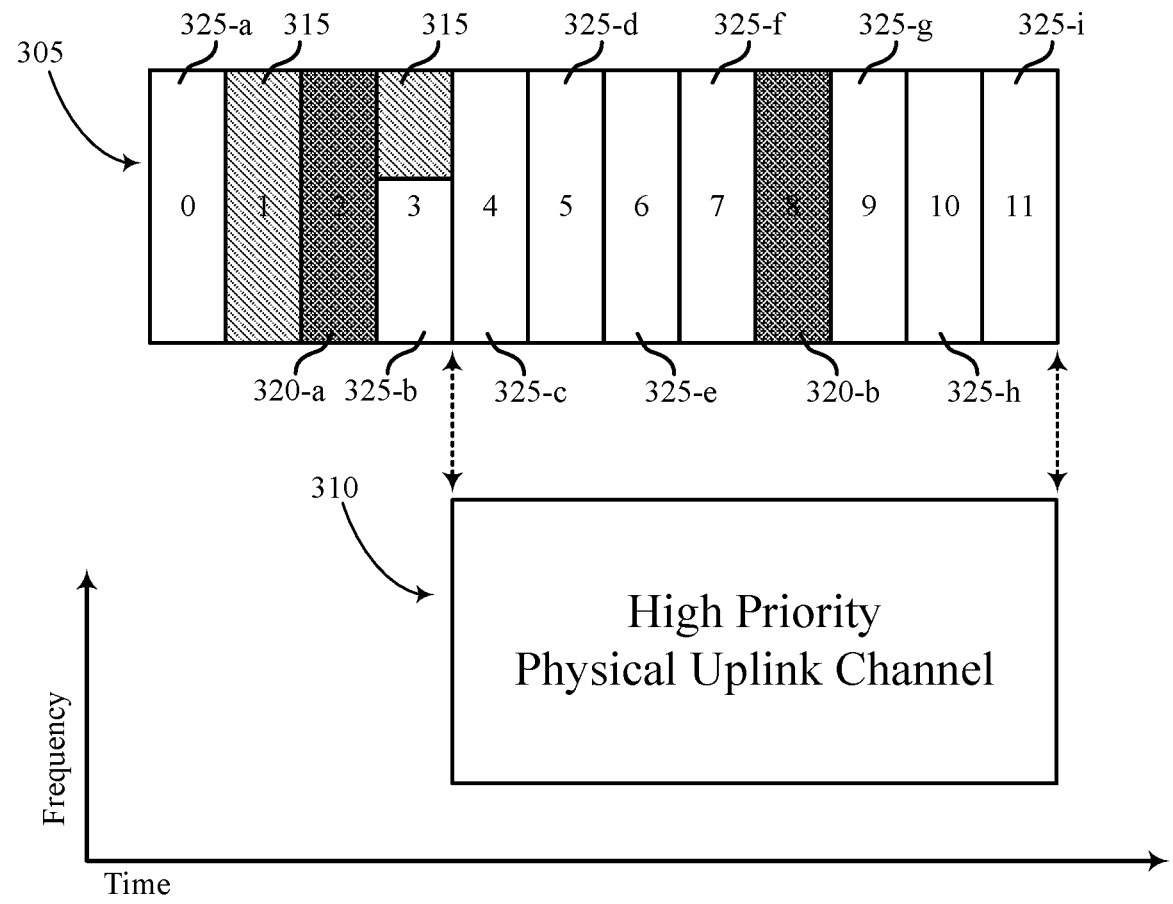
FIG. 3 illustrates an example of an environment that supports power control enhancement in accordance with examples described herein.

FIG. 3 illustrates an example of an environment 300 that supports power control for uplink transmission multiplexing in accordance with examples described herein.

In the illustrated example, environment 300 may include a multiplexed transmission 305 that includes at least a first uplink transmission and a second uplink transmission, where at least the first uplink transmission is multiplexed with the second uplink transmission. As shown, environment 300 may also include a third uplink transmission 310.

In the illustrated example, multiplexed transmission 305 may include a number of symbols (e.g., 11 symbols in the provided example) that may include various content or payloads. In some cases, the symbols may include OFDM symbols. As shown, multiplexed transmission 305 may include a high priority HARQ acknowledgement (HARQ-ACK) feedback 315. As shown, HARQ-ACK feedback 315 may occupy (e.g., be piggybacked on) symbol 1 and partially occupy symbol 3. As shown, a first demodulation reference signal (DMRS) 320-a may occupy symbol 2 of multiplexed transmission 305 and a second DMRS 320-b may occupy symbol 8 of multiplexed transmission 305. In the illustrated example, multiplexed transmission 305 may include a low priority physical uplink channel 325 (e.g., a low priority physical uplink shared channel (PUSCH) or low priority physical uplink control channel (PUCCH) from 325-a to 325-i) that occupies symbol 0, part of symbol 3, symbols 4 through 7, and symbols 9 through 11. In some cases, multiplexed transmission 305 may be designated a low priority uplink transmission. In some cases, multiplexed transmission 305 may be designated a low priority uplink transmission based on the content of multiplexed transmission 305 (e.g., based on the low priority physical uplink channel 325).

In the illustrated example, third uplink transmission 310 may include a physical uplink channel (e.g., PUSCH or PUCCH) that may include various content or payloads. In some cases, third uplink transmission 310 may be designated a high priority uplink channel. In some cases, third uplink transmission 310 may be designated a high priority uplink channel based on the content of third uplink transmission 310.

In some examples, the content of the uplink transmission may determine the priority of the respective uplink transmissions according to a power control prioritization hierarchy. In some cases, the power control prioritization hierarchy may indicate that content associated with a random access channel on a primary cell has a first priority (e.g., highest overall priority) and content associated with a sounding reference signal transmission has a second priority (e.g., lowest overall priority).

For power control prioritization, the priority of an uplink transmission may be determined by the highest priority of the contents/payloads included in the uplink transmission among the following:
High priority HARQ-ACK, scheduling request (SR), link recovery request (LRR);
High priority CSI;
High priority uplink UL-SCH (e.g., uplink data);
Low priority HARQ-ACK, SR, LRR;
Low priority channel status information (CSI);
Low priority UL-SCH (e.g., uplink data).

For example, a PUCCH with both low priority and high priority HARQ-ACK may be determined to have the same priority as a high priority PUCCH with HARQ-ACK. In some cases, a low priority PUSCH carrying high priority HARQ-ACK may be determined to have the same priority as high priority HARQ-ACK. In some cases, a high priority PUSCH carrying low priority HARQ-ACK may be determined to have the same priority as high priority PUSCH without HARQ-ACK.

In some examples, the priority hierarchy for NR uplink transmissions from highest priority to lowest priority may be configured as follows:
1. Physical random access channel on a primary cell;
2. PUCCH/PUSCH that contains high priority HARQ-ACK and/or high priority SR and/or high priority LRR (and may include other contents, e.g., low priority HARQ-ACK, low priority CSI, etc.);
3. PUCCH/PUSCH with high priority CSI;
4. High priority PUSCH without high priority HARQ-ACK or high priority CSI;
5. Low priority PUCCH/PUSCH that contains low priority HARQ-ACK and/or low priority SR and/or low priority LRR;
6. Low priority PUCCH/PUSCH with low priority CSI;
7. Low priority PUSCH without HARQ-ACK or CSI;
8. Sounding reference signal (SRS) transmission.

In some examples, the power control prioritization hierarchy may indicate that content associated with a physical uplink channel (e.g., content of multiplexed transmission 305 or content of third uplink transmission 310) that includes one or more of a HARQ-ACK, or a high priority SR, or a high priority LRR, has a higher priority than content associated with a physical uplink channel that includes a high priority CSI.

In some examples, the power control prioritization hierarchy may indicate that content that includes a high priority CSI has a higher priority than content associated with a high priority physical uplink shared channel that lacks a high priority HARQ-ACK feedback and a high priority CSI. In some examples, the power control prioritization hierarchy may indicate content associated with a high priority physical uplink shared channel that lacks a high priority HARQ-ACK feedback and a high priority CSI has a higher priority than content associated with a low priority physical uplink channel that includes one or more of a low priority HARQ-ACK feedback, or a low priority SR, or a low priority LRR, or any combination thereof.

In some examples, the power control prioritization hierarchy may indicate that content associated with a low priority physical uplink channel that includes one or more of a low priority HARQ-ACK feedback, or a low priority SR, or a low priority LRR, has a higher priority than content associated with a low priority physical uplink channel that includes a low priority CSI. In some examples, the power control prioritization hierarchy may indicate that content associated with a low priority physical uplink channel that includes a low priority CSI has a higher priority than content associated with a low priority physical uplink shared channel that lacks HARQ-ACK feedback and channel state information.

In some examples, according to the power control prioritization hierarchy a physical uplink channel with both low priority and high priority HARQ-ACK may be determined to have the same priority as a high priority physical uplink channel with HARQ-ACK. According to the power control prioritization hierarchy, a low priority physical uplink channel (e.g., low priority physical uplink channel 325 of multiplexed transmission 305) carrying high priority HARQ-ACK feedback may be determined to have the same priority as an uplink transmission with a high priority HARQ-ACK feedback. According to the power control prioritization hierarchy, a high priority physical uplink channel carrying low priority HARQ-ACK may be determined to have the same priority as a high priority physical uplink channel without HARQ-ACK.

The present techniques may include a UE (e.g., a UE 115 of FIG. 1 or FIG. 2) applying a power control prioritization hierarchy on a per-transmission basis. In some cases, a first uplink carrier may be associated with multiplexed transmission 305 and a second uplink carrier may be associated with third uplink transmission 310. When the UE determines that a combined total transmit power of the first and second uplink carriers would exceed a defined power ceiling, the transmit powers computed for the first and second uplink carriers may be respectively scaled back based on the respective priority levels of multiplexed transmission 305 and third uplink transmission 310. When the UE determines that multiplexed transmission 305 is designated a low priority uplink transmission and third uplink transmission 310 is designated a high priority uplink channel, or that a priority level of third uplink transmission 310 exceeds a priority level of multiplexed transmission 305, the UE may scale back a transmit power of multiplexed transmission 305 by a greater amount than a transmit power of third uplink transmission 310. In some cases, when multiplexed transmission 305 and third uplink transmission 310 are scheduled with transmit power P1 and P2, respectively, and the sum power is greater than P_max (e.g., P1+P2>P_max), then the UE may first allocate power to the higher priority transmission until the allocated power of the higher priority transmission reaches the corresponding scheduled power (e.g., reaches P1 for multiplexed transmission 305 or reach P2 for third uplink transmission 310). The UE may then allocate the remaining power (e.g., of the total available power up to P_max) to the lower priority transmission. In some cases, when the scheduled power of the high priority transmission exceeds P_max, then the UE may allocate power (e.g., all of the power) to the high priority transmission and not allocate any power to the low priority channel (e.g., the low priority channel may be dropped). In some cases, when the UE determines that multiplexed transmission 305 is designated a high priority uplink transmission and third uplink transmission 310 is designated a low priority uplink channel, or that a priority level of multiplexed transmission 305 exceeds a priority level of third uplink transmission 310, the UE may scale back a transmit power of third uplink transmission 310 by a greater amount than a transmit power of multiplexed transmission 305.

The present techniques may include a UE (e.g., a UE 115 of FIG. 1 or FIG. 2) applying a power control prioritization hierarchy on a per-symbol basis (e.g., on a per-OFDM symbol basis). Accordingly, the UE may apply the power control prioritization hierarchy to the symbols multiplexed transmission 305 on a per-symbol basis. For instance, the UE may apply a first priority to symbol 1 of multiplexed transmission 305 based on the content of symbol 1 (e.g., a high priority uplink transmission) and apply a second priority, different from the first priority, to symbol 2 of multiplexed transmission 305 based on the content of symbol 2 (e.g., a low priority uplink transmission), and so on. In some cases, the UE may determine the priority of the content carried on each symbol, and determines the transmission power for each symbol based on the respective determined priorities. In some cases, the priority of a DMRS symbol 320 of multiplexed transmission 305 may be equal to the priority of the highest priority content in multiplexed transmission 305 (e.g., the priority of the DMRS 320 may be equal to the priority of HARQ-ACK feedback 315).

In some examples, priority may be determined symbol-by-symbol for a given uplink transmission. In some cases, a first set of one or more symbol of multiplexed transmission 305 may have a first priority and a second set of one or more symbol of multiplexed transmission 305 may have a second priority different from the first priority, while multiplexed transmission 305 does not have an overall priority. Similarly, a first set of one or more symbol of third uplink transmission 310 may have a first priority and a second set of one or more symbol of third uplink transmission 310 may have a second priority different from the first priority, while third uplink transmission 310 does not have an overall priority. Alternatively, in some cases, priority may be determined by a traffic type of a given uplink transmission. In some cases, multiplexed transmission 305 may be designated overall as a low priority physical uplink channel (e.g., because multiplexed transmission 305 is associated with eMBB traffic), while third uplink transmission 310 may be designated overall as a high priority physical uplink channel (e.g., because third uplink transmission 310 is associated with URLLC traffic). In some cases, a UE may determine a priority of an uplink transmission. In some cases, a base station may determine a priority of an uplink transmission.

In the illustrated example, multiplexed transmission 305 may include high priority content. For example, symbol 1 and part of symbol 3 of multiplexed transmission 305 includes HARQ-ACK feedback 315. Accordingly, at least symbol 1 and part of symbol 3 of multiplexed transmission 305 may be designated as high priority based on the content of symbol 1 and part of symbol 3 that carry HARQ-ACK feedback 315. However, because symbols 1 through 3 of multiplexed transmission 305 do not overlap with third uplink transmission 310, symbols 1 through 3 of multiplexed transmission 305 may be transmitted without determining or without considering a determination of power prioritization between multiplexed transmission 305 and third uplink transmission 310.

In the illustrated example, third uplink transmission 310 at least partially overlaps multiplexed transmission 305 in time. As shown, third uplink transmission 310 overlaps symbols 4 through 11 of multiplexed transmission 305. In some cases, an associated UE may determine that multiplexed transmission 305 and third uplink transmission 310 overlap on symbols 4 through 11 of multiplexed transmission 305. Based on the determined overlap, the UE may determine that third uplink transmission 310 is designated as a high priority physical uplink channel. Also, based on the determined overlap, the UE may determine the priority of the content of each overlapped symbol (e.g., symbols 4 through 11 of multiplexed transmission 305). In some cases, the UE may use the power control prioritization hierarchy to determine the priority of each overlapped symbol. In some cases, the UE may assign a priority level to each of the overlapped symbols.

In the illustrated example, the UE may determine that the priority level of the content of each of symbols 4 through 11 has a lower priority than the content of third uplink transmission 310. Accordingly, the UE may prioritize a transmit power of third uplink transmission 310 over a transmit power of symbols 4 through 11 of multiplexed transmission 305. Accordingly, third uplink transmission 310 may be prioritized for transmit power over symbols 4 through 11 of multiplexed transmission 305 (e.g., more transmit power may be allocated to third uplink transmission 310 than to symbols 4 through 11 of multiplexed transmission 305 according to respective priorities on a per-symbol basis).

In some examples, third uplink transmission 310 may overlap symbol 1 or symbol 3, or both. In some cases, the UE may determine the overlap and then based on the determined overlap the UE may determine the priority of the content of the overlapped symbols (e.g., symbol 1 or symbol 3, or both) with respect to a priority level of third uplink transmission 310. In some cases, the UE may use the power control prioritization hierarchy to determine that the priority of the overlapped symbols is greater than the priority of third uplink transmission 310. Accordingly, symbol 1 or symbol 3, or both, of multiplexed transmission 305 may be prioritized for transmit power over third uplink transmission 310 (e.g., more transmit power may be allocated to symbol 1 or symbol 3, or both, than to third uplink transmission 310 according to respective priorities on a per-symbol basis).

Figure 4:
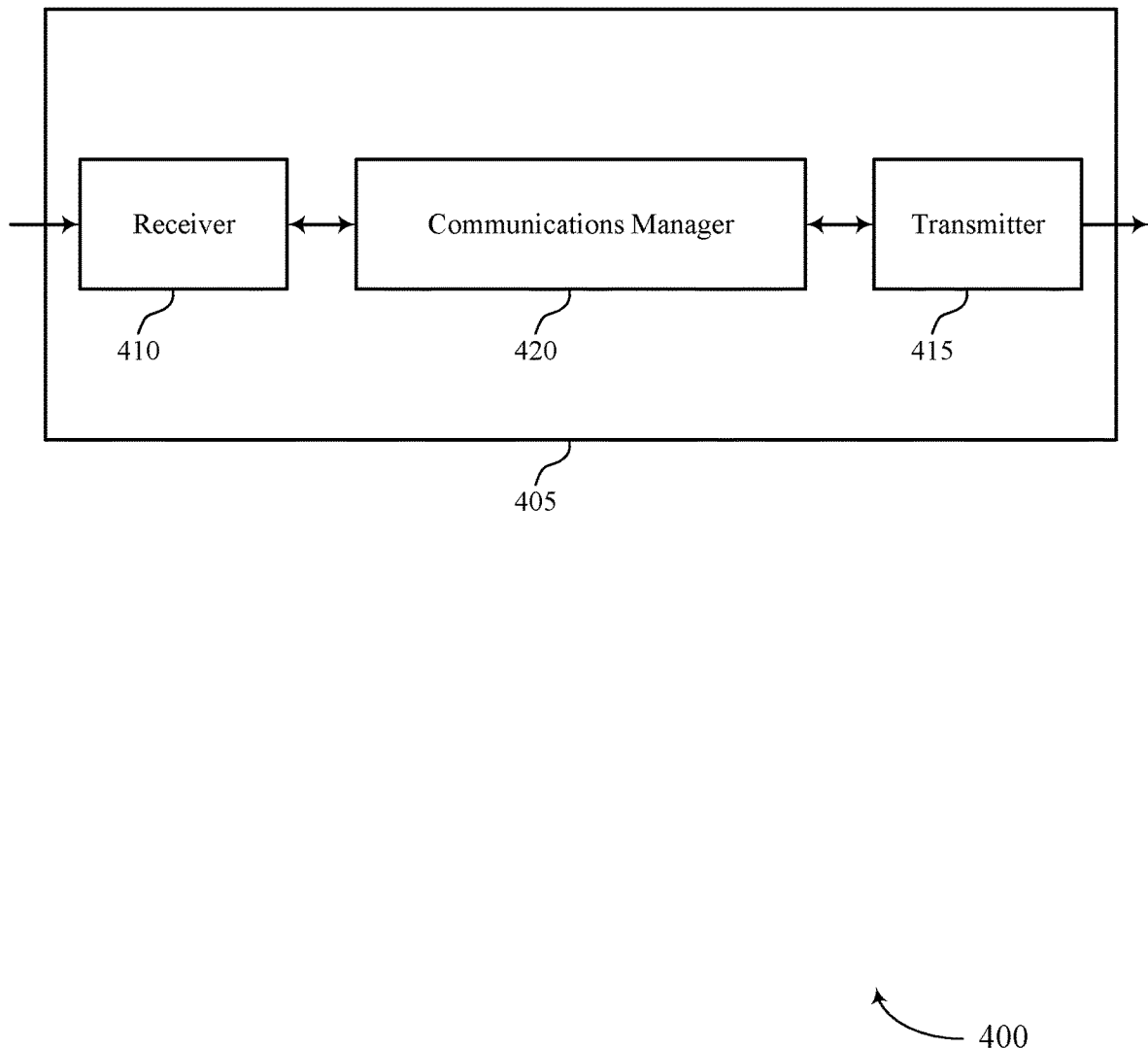
FIGS. 4 and 5 show block diagrams of devices that support power control enhancement in accordance with examples described herein.

FIG. 4 shows a block diagram 400 of a device 405 that supports power control for uplink transmission multiplexing in accordance with examples described herein. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to power control for uplink transmission multiplexing). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to power control for uplink transmission multiplexing). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of power control for uplink transmission multiplexing as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support power control prioritization of wireless communication by a UE in accordance with examples as disclosed herein. For example, the communications manager 420 may be configured as or otherwise support a means for assigning a first priority level to a multiplexed transmission on a first component carrier, the multiplexed transmission including a first uplink transmission multiplexed with a second uplink transmission, where the first priority level assigned to the multiplexed transmission is based on a priority of content (e.g. highest priority content) of the first uplink transmission and the second uplink transmission. The communications manager 420 may be configured as or otherwise support a means for assigning a second priority level to a third uplink transmission on a second component carrier based on a content of the third uplink transmission, where the third uplink transmission overlaps in time with the multiplexed transmission. The communications manager 420 may be configured as or otherwise support a means for performing the multiplexed transmission on the first component carrier at a first transmit power and the third uplink transmission on the second component carrier at a second transmit power, where the first transmit power and the second transmit power are respectively based on the first priority level and the second priority level.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for reduced processing, reduced power usage, and improved efficiency of utilization of communication resources by prioritizing power control of wireless communications that include multiplexed transmissions, thus improving user experience of the one or more devices with longer battery life, improved quality of service, and improved data throughput.

Figure 5:
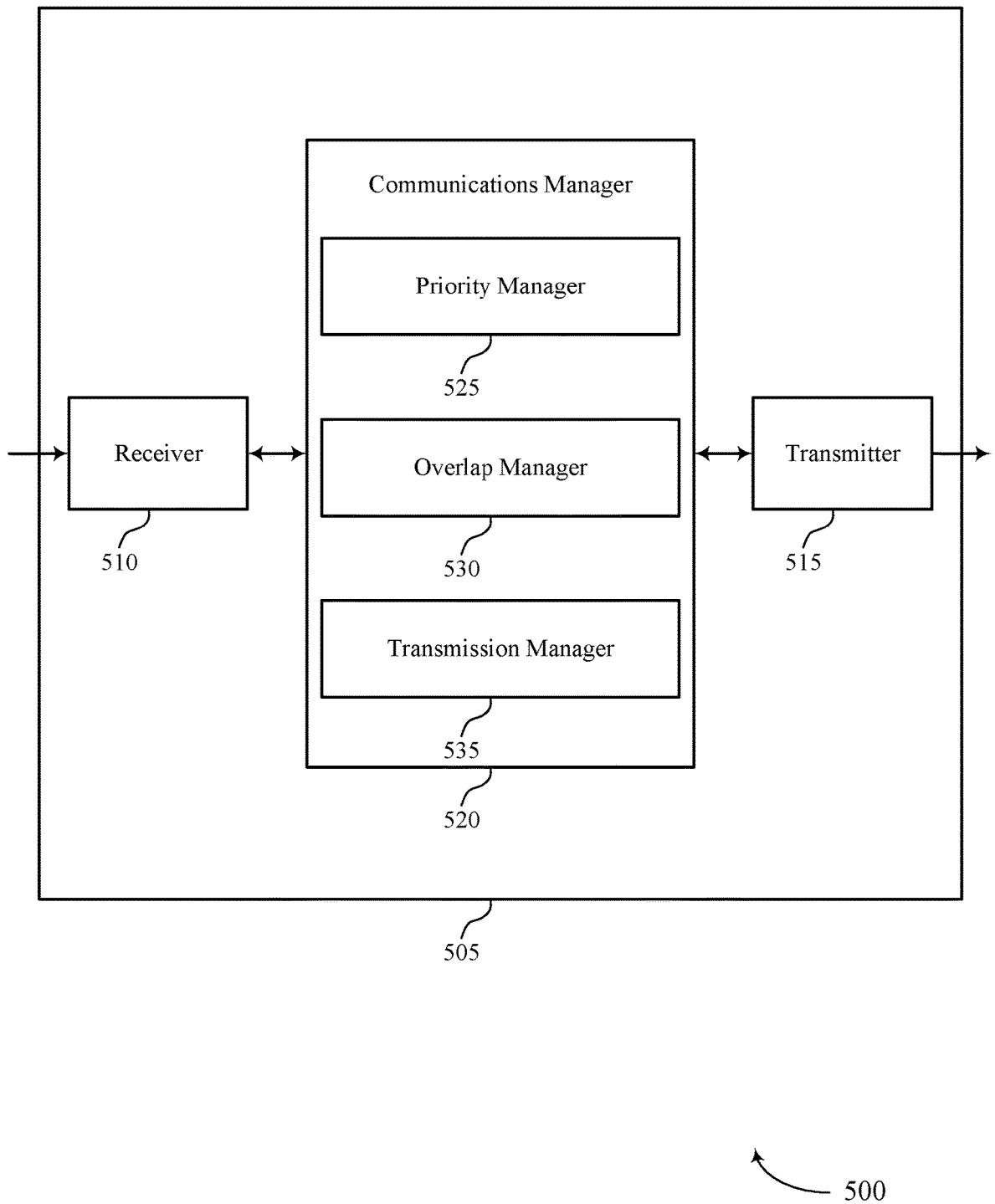

FIG. 5 shows a block diagram 500 of a device 505 that supports power control for uplink transmission multiplexing in accordance with examples described herein. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to power control for uplink transmission multiplexing). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to power control for uplink transmission multiplexing). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of power control for uplink transmission multiplexing as described herein. For example, the communications manager 520 may include a priority manager 525, an overlap manager 530, a transmission manager 535, or any combination thereof. The communications manager 520 may be an example of aspects of a communications manager 520 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support power control prioritization of wireless communication by a UE in accordance with examples as disclosed herein. The priority manager 525 may be configured as or otherwise support a means for assigning a first priority level to a multiplexed transmission on a first component carrier, the multiplexed transmission including a first uplink transmission multiplexed with a second uplink transmission, where the first priority level assigned to the multiplexed transmission is based on a priority of content (e.g., highest priority content) of the first uplink transmission and the second uplink transmission. The overlap manager 530 may be configured as or otherwise support a means for assigning a second priority level to a third uplink transmission on a second component carrier based on a content of the third uplink transmission, where the third uplink transmission overlaps in time with the multiplexed transmission. The transmission manager 535 may be configured as or otherwise support a means for performing the multiplexed transmission on the first component carrier at a first transmit power and the third uplink transmission on the second component carrier at a second transmit power, where the first transmit power and the second transmit power are respectively based on the first priority level and the second priority level.

Figure 6:
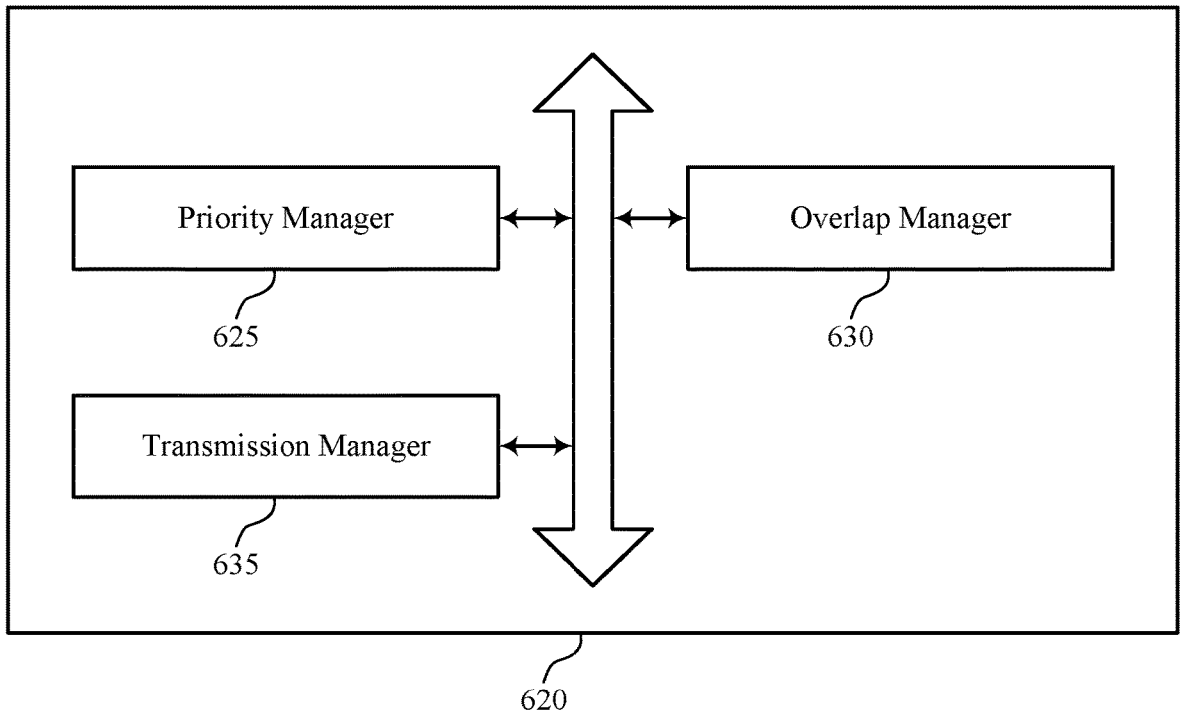
FIG. 6 shows a block diagram of a communications manager that supports power control enhancement in accordance with examples described herein.

FIG. 6 shows a block diagram 600 of a communications manager 620 that supports power control for uplink transmission multiplexing in accordance with examples described herein. The communications manager 620 may be an example of aspects of a communications manager 420, a communications manager 520, or both, as described herein. The communications manager 620, or various components thereof, may be an example of means for performing various aspects of power control for uplink transmission multiplexing as described herein. For example, the communications manager 620 may include a priority manager 625, an overlap manager 630, a transmission manager 635, or any combination thereof. Each of these components may communicate, directly or indirectly, with one another (e.g., via one or more buses).

The communications manager 620 may support power control prioritization of wireless communication by a UE in accordance with examples as disclosed herein. The priority manager 625 may be configured as or otherwise support a means for assigning a first priority level to a multiplexed transmission on a first component carrier, the multiplexed transmission including a first uplink transmission multiplexed with a second uplink transmission, where the first priority level assigned to the multiplexed transmission is based on a priority of content (e.g., highest priority content) of the first uplink transmission and the second uplink transmission. The overlap manager 630 may be configured as or otherwise support a means for assigning a second priority level to a third uplink transmission on a second component carrier based on a content of the third uplink transmission, where the third uplink transmission overlaps in time with the multiplexed transmission. The transmission manager 635 may be configured as or otherwise support a means for performing the multiplexed transmission on the first component carrier at a first transmit power and the third uplink transmission on the second component carrier at a second transmit power, where the first transmit power and the second transmit power are respectively based on the first priority level and the second priority level.

In some examples, to support assigning the first priority level to the multiplexed transmission, the priority manager 625 may be configured as or otherwise support a means for assigning the first priority level to a first set of symbols of the multiplexed transmission, the first set of symbols associated with the first uplink transmission and the second uplink transmission. In some examples, to support assigning the first priority level to the multiplexed transmission, the overlap manager 630 may be configured as or otherwise support a means for assigning a third priority level to a second set of symbols of the multiplexed transmission, the second set of symbols associated with one of the first uplink transmission or the second uplink transmission.

In some examples, to support performing the multiplexed transmission on the first component carrier, the transmission manager 635 may be configured as or otherwise support a means for performing the multiplexed transmission on the first component carrier at the first transmit power for the first set of symbols and at a third transmit power different from the first transmit power for the second set of symbols.

In some examples, the first priority level or the second priority level, or both, is determined according to a priority hierarchy, where the first priority level assigned to the multiplexed transmission is based on a highest priority of content of the first uplink transmission and the second uplink transmission. In some examples, according to the priority hierarchy, content associated with a random access channel on a primary cell has a first priority (e.g., highest priority) and content associated with a sounding reference signal transmission has a second priority (e.g., lowest priority). In some examples, according to the priority hierarchy, content associated with a physical uplink channel that includes one or more of a high priority hybrid automatic repeat request acknowledgment feedback, or a high priority scheduling request, or a high priority link recovery request, has a higher priority than content associated with a physical uplink channel that includes a high priority channel status information.

In some examples, according to the priority hierarchy, content associated with a physical uplink channel that includes a high priority channel status information has a higher priority than content associated with a high priority physical uplink shared channel that lacks a high priority uplink control information. In some examples, according to the priority hierarchy, content associated with a high priority physical uplink shared channel that lacks either one of a high priority hybrid automatic repeat request acknowledgment feedback or a high priority channel status information has a higher priority than content associated with a low priority physical uplink channel that includes one or more of a low priority hybrid automatic repeat request acknowledgment feedback, or a low priority scheduling request, or a low priority link recovery request, or any combination thereof. In some examples, according to the priority hierarchy, content associated with a high priority physical uplink shared channel that lacks a high priority uplink control information has a higher priority than content associated with a low priority physical uplink channel that includes one or more of a low priority hybrid automatic repeat request acknowledgment feedback, or a low priority scheduling request, or a low priority link recovery request, or any combination thereof In some examples, according to the priority hierarchy, content associated with a low priority physical uplink channel that includes one or more of a low priority hybrid automatic repeat request acknowledgment feedback, or a low priority scheduling request, or a low priority link recovery request, has a higher priority than content associated with a low priority physical uplink channel that includes a low priority channel state information. In some examples, according to the priority hierarchy, content associated with a low priority physical uplink channel that includes a low priority channel state information has a higher priority than content associated with a low priority physical uplink shared channel that lacks hybrid automatic repeat request acknowledgment feedback or channel state information. In some examples, according to the priority hierarchy, content associated with a low priority physical uplink channel that includes a low priority channel state information has a higher priority than content associated with a low priority physical uplink shared channel that lacks uplink control information.

Figure 7:
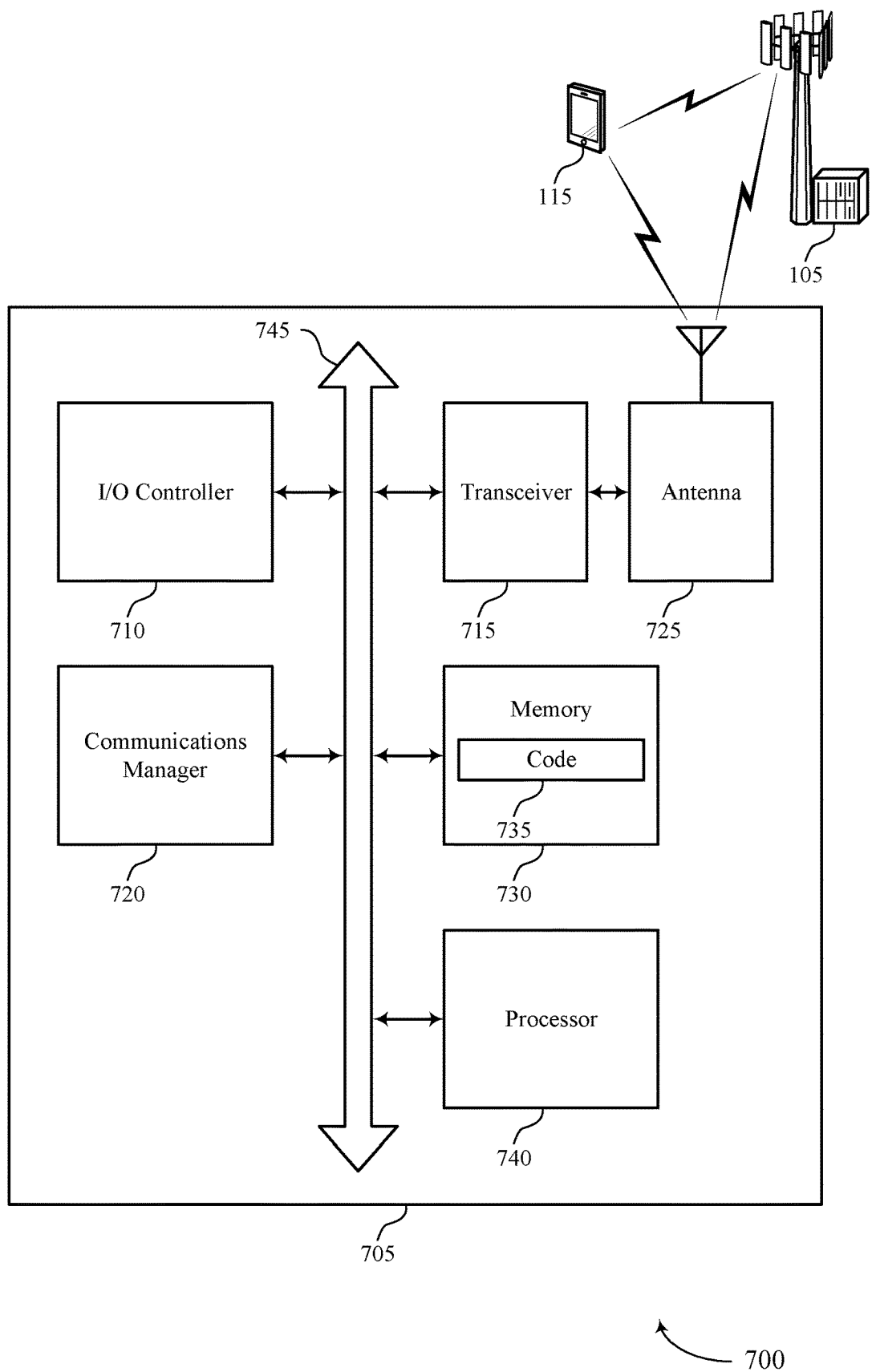
FIG. 7 shows a diagram of a system including a device that supports power control enhancement in accordance with examples described herein.

FIG. 7 shows a diagram of a system 700 including a device 705 that supports power control for uplink transmission multiplexing in accordance with examples described herein. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting power control for uplink transmission multiplexing). For example, the device 705 or a component of the device 705 may include a processor 740 and memory 730 coupled with the processor 740, the processor 740 and memory 730 configured to perform various functions described herein.

The communications manager 720 may support power control prioritization of wireless communication by a UE in accordance with examples as disclosed herein. For example, the communications manager 720 may be configured as or otherwise support a means for assigning a first priority level to a multiplexed transmission on a first component carrier, the multiplexed transmission including a first uplink transmission multiplexed with a second uplink transmission, where the first priority level assigned to the multiplexed transmission is based on a priority of content (e.g., highest priority content) of the first uplink transmission and the second uplink transmission. The communications manager 720 may be configured as or otherwise support a means for assigning a second priority level to a third uplink transmission on a second component carrier based on a content of the third uplink transmission, where the third uplink transmission overlaps in time with the multiplexed transmission. The communications manager 720 may be configured as or otherwise support a means for performing the multiplexed transmission on the first component carrier at a first transmit power and the third uplink transmission on the second component carrier at a second transmit power, where the first transmit power and the second transmit power are respectively based on the first priority level and the second priority level.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, improved utilization of processing capability, and efficiency of one or more devices (e.g., battery-operated devices, a UE 115 of FIG. 1 or FIG. 2, device 405 of FIG. 4, device 505 of FIG. 4, communications manager 620, device 705 of FIG. 7, etc.) by prioritizing power control of wireless communications that include multiplexed transmissions, thus improving user experience of the one or more devices with longer battery life, improved quality of service, and improved data throughput.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of power control for uplink transmission multiplexing as described herein, or the processor 740 and the memory 730 may be otherwise configured to perform or support such operations.

Figure 8:
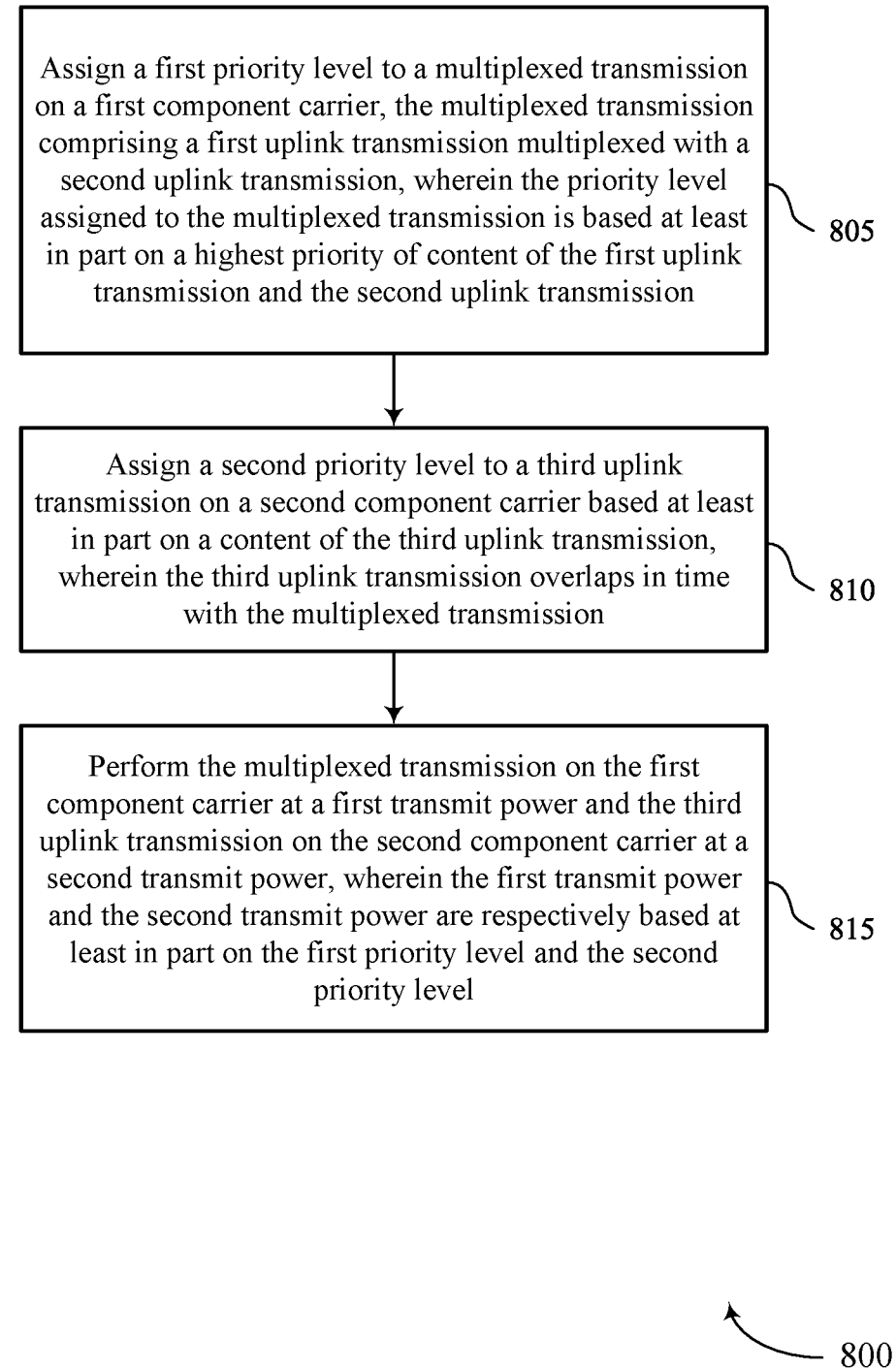
FIGS. 8 and 9 show flowcharts illustrating methods that support power control enhancement in accordance with examples described herein.

FIG. 8 shows a flowchart illustrating a method 800 that supports power control for uplink transmission multiplexing in accordance with examples described herein. The operations of the method 800 may be implemented by a UE or its components as described herein. For example, the operations of the method 800 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 805, the method may include assigning a first priority level to a multiplexed transmission on a first component carrier, the multiplexed transmission including a first uplink transmission multiplexed with a second uplink transmission, where the first priority level assigned to the multiplexed transmission is based on a priority of the content (e.g., highest priority content) of the first uplink transmission and the second uplink transmission. The operations of 805 may be performed in accordance with examples as disclosed herein. In some examples, aspects of the operations of 805 may be performed by a priority manager 625 as described with reference to FIG. 6.

At 810, the method may include assigning a second priority level to a third uplink transmission on a second component carrier based on a content of the third uplink transmission, where the third uplink transmission overlaps in time with the multiplexed transmission. The operations of 810 may be performed in accordance with examples as disclosed herein. In some examples, aspects of the operations of 810 may be performed by an overlap manager 630 as described with reference to FIG. 6.

At 815, the method may include performing the multiplexed transmission on the first component carrier at a first transmit power and the third uplink transmission on the second component carrier at a second transmit power, where the first transmit power and the second transmit power are respectively based on the first priority level and the second priority level. The operations of 815 may be performed in accordance with examples as disclosed herein. In some examples, aspects of the operations of 815 may be performed by a transmission manager 635 as described with reference to FIG. 6.

Figure 9:
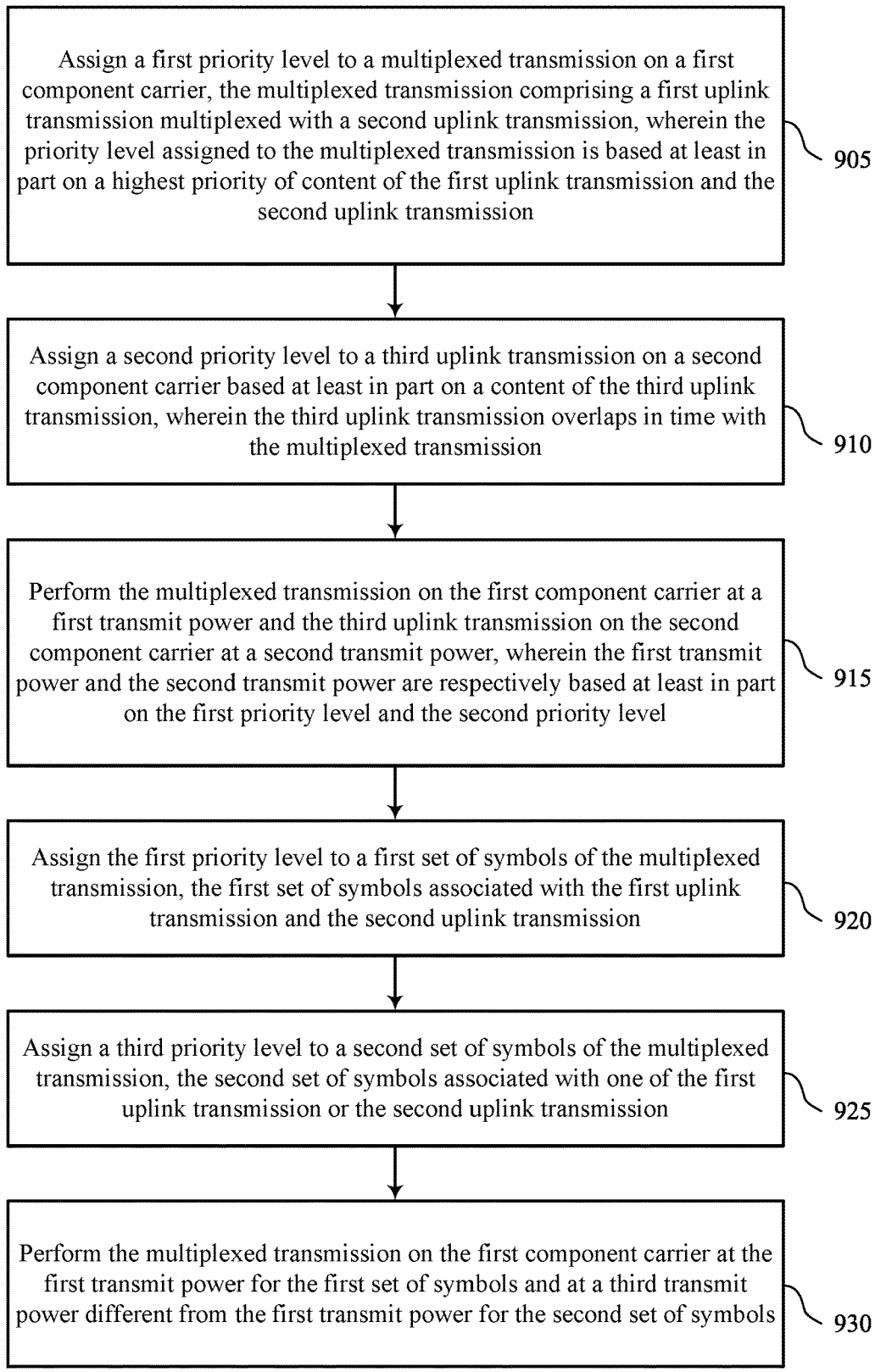

FIG. 9 shows a flowchart illustrating a method 900 that supports power control for uplink transmission multiplexing in accordance with examples described herein. The operations of the method 900 may be implemented by a UE or its components as described herein. For example, the operations of the method 900 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 905, the method may include assigning a first priority level to a multiplexed transmission on a first component carrier, the multiplexed transmission including a first uplink transmission multiplexed with a second uplink transmission, where the first priority level assigned to the multiplexed transmission is based on a priority of the content (e.g., highest priority content) of the first uplink transmission and the second uplink transmission. The operations of 905 may be performed in accordance with examples as disclosed herein. In some examples, aspects of the operations of 905 may be performed by a priority manager 625 as described with reference to FIG. 6.

At 910, the method may include assigning a second priority level to a third uplink transmission on a second component carrier based on a content of the third uplink transmission, where the third uplink transmission overlaps in time with the multiplexed transmission. The operations of 910 may be performed in accordance with examples as disclosed herein. In some examples, aspects of the operations of 910 may be performed by an overlap manager 630 as described with reference to FIG. 6.

At 915, the method may include performing the multiplexed transmission on the first component carrier at a first transmit power and the third uplink transmission on the second component carrier at a second transmit power, where the first transmit power and the second transmit power are respectively based on the first priority level and the second priority level. The operations of 915 may be performed in accordance with examples as disclosed herein. In some examples, aspects of the operations of 915 may be performed by a transmission manager 635 as described with reference to FIG. 6.

At 920, the method may include assigning the first priority level to a first set of symbols of the multiplexed transmission, the first set of symbols associated with the first uplink transmission and the second uplink transmission. The operations of 920 may be performed in accordance with examples as disclosed herein. In some examples, aspects of the operations of 920 may be performed by a priority manager 625 as described with reference to FIG. 6.

At 925, the method may include assigning a third priority level to a second set of symbols of the multiplexed transmission, the second set of symbols associated with one of the first uplink transmission or the second uplink transmission. The operations of 925 may be performed in accordance with examples as disclosed herein. In some examples, aspects of the operations of 925 may be performed by an overlap manager 630 as described with reference to FIG. 6.

At 930, the method may include performing the multiplexed transmission on the first component carrier at the first transmit power for the first set of symbols and at a third transmit power different from the first transmit power for the second set of symbols. The operations of 930 may be performed in accordance with examples as disclosed herein. In some examples, aspects of the operations of 930 may be performed by a transmission manager 635 as described with reference to FIG. 6.

The following provides an overview of examples described herein:

Aspect 1: A method for power control prioritization of wireless communication by a UE, comprising: assigning a first priority level to a multiplexed transmission on a first component carrier, the multiplexed transmission comprising a first uplink transmission multiplexed with a second uplink transmission, wherein the first priority level assigned to the multiplexed transmission is based at least in part on a priority of content of the first uplink transmission and the second uplink transmission; assigning a second priority level to a third uplink transmission on a second component carrier based at least in part on a content of the third uplink transmission, wherein the third uplink transmission overlaps in time with the multiplexed transmission; and performing the multiplexed transmission on the first component carrier at a first transmit power and the third uplink transmission on the second component carrier at a second transmit power, wherein the first transmit power and the second transmit power are respectively based at least in part on the first priority level and the second priority level.

Aspect 2: The method of aspect 1, wherein the first priority level or the second priority level, or both, is determined according to a priority hierarchy, and wherein the first priority level assigned to the multiplexed transmission is based at least in part on a highest priority of content of the first uplink transmission and the second uplink transmission.

Aspect 3: The method of aspect 2, wherein according to the priority hierarchy, content associated with a random access channel on a primary cell has a first priority and content associated with a sounding reference signal transmission has a second priority, wherein the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

Aspect 4: The method of any of aspects 2 through 3, wherein according to the priority hierarchy, content associated with a physical uplink channel that comprises one or more of a high priority hybrid automatic repeat request acknowledgment feedback, or a high priority scheduling request, or a high priority link recovery request, has a higher priority than content associated with a physical uplink channel that comprises a high priority channel status information.

Aspect 5: The method of any of aspects 2 through 4, wherein according to the priority hierarchy, content associated with a physical uplink channel that comprises a high priority channel status information has a higher priority than content associated with a high priority physical uplink shared channel that lacks a high priority uplink control information.

Aspect 6: The method of any of aspects 2 through 5, wherein according to the priority hierarchy, content associated with a high priority physical uplink shared channel that lacks a high priority uplink control information has a higher priority than content associated with a low priority physical uplink channel that comprises one or more of a low priority hybrid automatic repeat request acknowledgment feedback, or a low priority scheduling request, or a low priority link recovery request, or any combination thereof Aspect 7: The method of any of aspects 2 through 6, wherein according to the priority hierarchy, content associated with a low priority physical uplink channel that comprises one or more of a low priority hybrid automatic repeat request acknowledgment feedback, or a low priority scheduling request, or a low priority link recovery request, has a higher priority than content associated with a low priority physical uplink channel that comprises a low priority channel state information.

Aspect 8: The method of any of aspects 2 through 7, wherein according to the priority hierarchy, content associated with a low priority physical uplink channel that comprises a low priority channel state information has a higher priority than content associated with a low priority physical uplink shared channel that lacks uplink control information.

Aspect 9: The method of aspect 1, wherein assigning the first priority level to the multiplexed transmission comprises: assigning the first priority level to a first set of symbols of the multiplexed transmission, the first set of symbols associated with the first uplink transmission and the second uplink transmission; and assigning a third priority level to a second set of symbols of the multiplexed transmission, the second set of symbols associated with one of the first uplink transmission or the second uplink transmission.

Aspect 10: The method of aspect 9, wherein performing the multiplexed transmission on the first component carrier comprises: performing the multiplexed transmission on the first component carrier at the first transmit power for the first set of symbols and at a third transmit power different from the first transmit power for the second set of symbols.

Aspect 11: An apparatus for power control prioritization of wireless communication by a UE, comprising a processor; memory coupled with the processor; and instructions stored in the memory and executable by the processor to cause the apparatus to perform a method of any of aspects 1 through 10.

Aspect 12: An apparatus for power control prioritization of wireless communication by a UE, comprising at least one means for performing a method of any of aspects 1 through 10.

Aspect 13: A non-transitory computer-readable medium storing code for power control prioritization of wireless communication by a UE, the code comprising instructions executable by a processor to perform a method of any of aspects 1 through 10.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for power control prioritization of wireless communication by a user equipment (UE), comprising:
assigning a first priority level to a multiplexed transmission on a first component carrier, the multiplexed transmission comprising a first uplink transmission multiplexed with a second uplink transmission, wherein the first priority level assigned to the multiplexed transmission is based at least in part on a priority of content of the first uplink transmission and the second uplink transmission;
assigning a second priority level to a third uplink transmission on a second component carrier based at least in part on a content of the third uplink transmission, wherein the third uplink transmission overlaps in time with the multiplexed transmission;
allocating, based at least in part on scheduled transmit powers of the multiplexed transmission and the third uplink transmission exceeding a maximum power, a first transmit power to the multiplexed transmission and a second transmit power to the third uplink transmission based at least in part on the first priority level and the second priority level, wherein a summation of the first transmit power and the second transmit power satisfies the maximum power; and
performing the multiplexed transmission comprising the first uplink transmission multiplexed with the second uplink transmission on the first component carrier at the first transmit power and the third uplink transmission on the second component carrier at the second transmit power.

2. The method of claim 1, wherein the first priority level or the second priority level, or both, is determined according to a priority hierarchy, and wherein the first priority level assigned to the multiplexed transmission is based at least in part on a highest priority of content of the first uplink transmission and the second uplink transmission.

3. The method of claim 2, wherein according to the priority hierarchy, content associated with a random access channel on a primary cell has a first priority and content associated with a sounding reference signal transmission has a second priority, wherein the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

4. The method of claim 2, wherein according to the priority hierarchy, content associated with a physical uplink channel that comprises one or more of a high priority hybrid automatic repeat request acknowledgment feedback, or a high priority scheduling request, or a high priority link recovery request, has a higher priority than content associated with a physical uplink channel that comprises a high priority channel status information.

5. The method of claim 2, wherein according to the priority hierarchy, content associated with a physical uplink channel that comprises a high priority channel status information has a higher priority than content associated with a high priority physical uplink shared channel that lacks a high priority uplink control information.

6. The method of claim 2, wherein according to the priority hierarchy, content associated with a high priority physical uplink shared channel that lacks a high priority uplink control information has a higher priority than content associated with a low priority physical uplink channel that comprises one or more of a low priority hybrid automatic repeat request acknowledgment feedback, or a low priority scheduling request, or a low priority link recovery request, or any combination thereof.

7. The method of claim 2, wherein according to the priority hierarchy, content associated with a low priority physical uplink channel that comprises one or more of a low priority hybrid automatic repeat request acknowledgment feedback, or a low priority scheduling request, or a low priority link recovery request, has a higher priority than content associated with a low priority physical uplink channel that comprises a low priority channel state information.

8. The method of claim 2, wherein according to the priority hierarchy, content associated with a low priority physical uplink channel that comprises a low priority channel state information has a higher priority than content associated with a low priority physical uplink shared channel that lacks uplink control information.

9. The method of claim 1, wherein assigning the first priority level to the multiplexed transmission comprises:
assigning the first priority level to a first set of symbols of the multiplexed transmission, the first set of symbols associated with the first uplink transmission and the second uplink transmission; and
assigning a third priority level to a second set of symbols of the multiplexed transmission, the second set of symbols associated with one of the first uplink transmission or the second uplink transmission.

10. The method of claim 9, wherein performing the multiplexed transmission on the first component carrier comprises:
performing the multiplexed transmission on the first component carrier at the first transmit power for the first set of symbols and at a third transmit power different from the first transmit power for the second set of symbols.

11. A user equipment (UE) for power control prioritization of wireless communication, comprising:
one or more memories storing processor-executable code; and
one or more processors coupled with the one or more memories and individually or collectively operable to execute the code to cause the UE to:
assign a first priority level to a multiplexed transmission on a first component carrier, the multiplexed transmission comprising a first uplink transmission multiplexed with a second uplink transmission, wherein the first priority level assigned to the multiplexed transmission is based at least in part on a priority of content of the first uplink transmission and the second uplink transmission;
assign a second priority level to a third uplink transmission on a second component carrier based at least in part on a content of the third uplink transmission, wherein the third uplink transmission overlaps in time with the multiplexed transmission;
allocate, based at least in part on scheduled transmit powers of the multiplexed transmission and the third uplink transmission exceeding a maximum power, a first transmit power to the multiplexed transmission and a second transmit power to the third uplink transmission based at least in part on the first priority level and the second priority level, wherein a summation of the first transmit power and the second transmit power satisfies the maximum power; and
perform the multiplexed transmission comprising the first uplink transmission multiplexed with the second uplink transmission on the first component carrier at the first transmit power and the third uplink transmission on the second component carrier at the second transmit power.

12. The UE of claim 11, wherein the first priority level or the second priority level, or both, is determined according to a priority hierarchy, and wherein the first priority level assigned to the multiplexed transmission is based at least in part on a highest priority of content of the first uplink transmission and the second uplink transmission.

13. The UE of claim 12, wherein according to the priority hierarchy, content associated with a random access channel on a primary cell has a first priority and content associated with a sounding reference signal transmission has a second priority, wherein the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

14. The UE of claim 12, wherein according to the priority hierarchy, content associated with a physical uplink channel that comprises one or more of a high priority hybrid automatic repeat request acknowledgment feedback, or a high priority scheduling request, or a high priority link recovery request, has a higher priority than content associated with a physical uplink channel that comprises a high priority channel status information.

15. The UE of claim 12, wherein according to the priority hierarchy, content associated with a physical uplink channel that comprises a high priority channel status information has a higher priority than content associated with a high priority physical uplink shared channel that lacks a high priority uplink control information.

16. The UE of claim 12, wherein according to the priority hierarchy, content associated with a high priority physical uplink shared channel that lacks a high priority uplink control information has a higher priority than content associated with a low priority physical uplink channel that comprises one or more of a low priority hybrid automatic repeat request acknowledgment feedback, or a low priority scheduling request, or a low priority link recovery request, or any combination thereof.

17. The UE of claim 12, wherein according to the priority hierarchy, content associated with a low priority physical uplink channel that comprises one or more of a low priority hybrid automatic repeat request acknowledgment feedback, or a low priority scheduling request, or a low priority link recovery request, has a higher priority than content associated with a low priority physical uplink channel that comprises a low priority channel state information.

18. The UE of claim 12, wherein according to the priority hierarchy, content associated with a low priority physical uplink channel that comprises a low priority channel state information has a higher priority than content associated with a low priority physical uplink shared channel that lacks uplink control information.

19. A user equipment (UE) for power control prioritization of wireless communication, comprising:
means for assigning a first priority level to a multiplexed transmission on a first component carrier, the multiplexed transmission comprising a first uplink transmission multiplexed with a second uplink transmission, wherein the first priority level assigned to the multiplexed transmission is based at least in part on a priority of content of the first uplink transmission and the second uplink transmission;
means for assigning a second priority level to a third uplink transmission on a second component carrier based at least in part on a content of the third uplink transmission, wherein the third uplink transmission overlaps in time with the multiplexed transmission;
means for allocating, based at least in part on scheduled transmit powers of the multiplexed transmission and the third uplink transmission exceeding a maximum power, a first transmit power to the multiplexed transmission and a second transmit power to the third uplink transmission based at least in part on the first priority level and the second priority level, wherein a summation of the first transmit power and the second transmit power satisfies the maximum power; and
means for performing the multiplexed transmission comprising the first uplink transmission multiplexed with the second uplink transmission on the first component carrier at the first transmit power and the third uplink transmission on the second component carrier at the second transmit power.

20. The UE of claim 19, wherein the first priority level or the second priority level, or both, is determined according to a priority hierarchy, and wherein the first priority level assigned to the multiplexed transmission is based at least in part on a highest priority of content of the first uplink transmission and the second uplink transmission.

21. The UE of claim 20, wherein according to the priority hierarchy, content associated with a random access channel on a primary cell has a first priority and content associated with a sounding reference signal transmission has a second priority, wherein the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

22. The UE of claim 20, wherein according to the priority hierarchy, content associated with a physical uplink channel that comprises one or more of a high priority hybrid automatic repeat request acknowledgment feedback, or a high priority scheduling request, or a high priority link recovery request, has a higher priority than content associated with a physical uplink channel that comprises a high priority channel status information.

23. The UE of claim 20, wherein according to the priority hierarchy, content associated with a physical uplink channel that comprises a high priority channel status information has a higher priority than content associated with a high priority physical uplink shared channel that lacks a high priority uplink control information.

24. The UE of claim 20, wherein according to the priority hierarchy, content associated with a high priority physical uplink shared channel that lacks a high priority uplink control information has a higher priority than content associated with a low priority physical uplink channel that comprises one or more of a low priority hybrid automatic repeat request acknowledgment feedback, or a low priority scheduling request, or a low priority link recovery request, or any combination thereof.

25. The UE of claim 20, wherein according to the priority hierarchy, content associated with a low priority physical uplink channel that comprises one or more of a low priority hybrid automatic repeat request acknowledgment feedback, or a low priority scheduling request, or a low priority link recovery request, has a higher priority than content associated with a low priority physical uplink channel that comprises a low priority channel state information.

26. The UE of claim 20, wherein according to the priority hierarchy, content associated with a low priority physical uplink channel that comprises a low priority channel state information has a higher priority than content associated with a low priority physical uplink shared channel that lacks uplink control information.

27. A non-transitory computer-readable medium storing code for power control prioritization of wireless communication by a user equipment (UE), the code comprising instructions executable by one or more processors to:
assign a first priority level to a multiplexed transmission on a first component carrier, the multiplexed transmission comprising a first uplink transmission multiplexed with a second uplink transmission, wherein the first priority level assigned to the multiplexed transmission is based at least in part on a priority of content of the first uplink transmission and the second uplink transmission;
assign a second priority level to a third uplink transmission on a second component carrier based at least in part on a content of the third uplink transmission, wherein the third uplink transmission overlaps in time with the multiplexed transmission;
allocate, based at least in part on scheduled transmit powers of the multiplexed transmission and the third uplink transmission exceeding a maximum power, a first transmit power to the multiplexed transmission and a second transmit power to the third uplink transmission based at least in part on the first priority level and the second priority level, wherein a summation of the first transmit power and the second transmit power satisfies the maximum power; and
perform the multiplexed transmission comprising the first uplink transmission multiplexed with the second uplink transmission on the first component carrier at the first transmit power and the third uplink transmission on the second component carrier at the second transmit power.

28. The non-transitory computer-readable medium of claim 27, wherein the first priority level or the second priority level, or both, is determined according to a priority hierarchy, and wherein the first priority level assigned to the multiplexed transmission is based at least in part on a highest priority of content of the first uplink transmission and the second uplink transmission.

29. The non-transitory computer-readable medium of claim 28, wherein according to the priority hierarchy, content associated with a random access channel on a primary cell has a first priority and content associated with a sounding reference signal transmission has a second priority, wherein the first priority has a higher priority than the second priority and a higher priority than a priority of an uplink control transmission or a priority of an uplink data transmission, or both, and the second priority has a lower priority than the priority of the uplink control transmission or the priority of the uplink data transmission, or both.

30. The non-transitory computer-readable medium of claim 28, wherein according to the priority hierarchy, content associated with a physical uplink channel that comprises one or more of a high priority hybrid automatic repeat request acknowledgment feedback, or a high priority scheduling request, or a high priority link recovery request, has a higher priority than content associated with a physical uplink channel that comprises a high priority channel status information.

* * * * *